Dec. 4, 1928. 1,693,838
F. FAUDI
METHOD OF MAKING SHAFTS, CONNECTING RODS, AND THE LIKE
Original Filed March 10, 1924    2 Sheets-Sheet 1
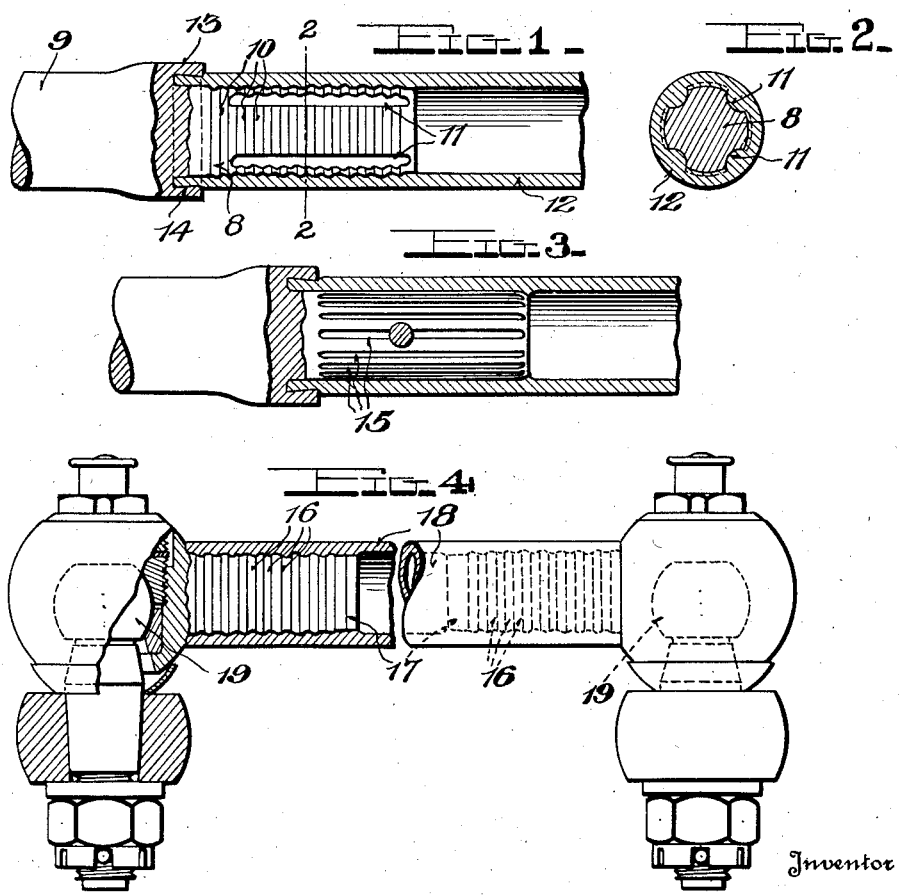
Inventor
Fritz Faudi
By
Attorney Dec. 4, 1928. 1,693,838
F. FAUDI
METHOD OF MAKING SHAFTS, CONNECTING RODS, AND THE LIKE
Original Filed March 10, 1924   2 Sheets-Sheet 2
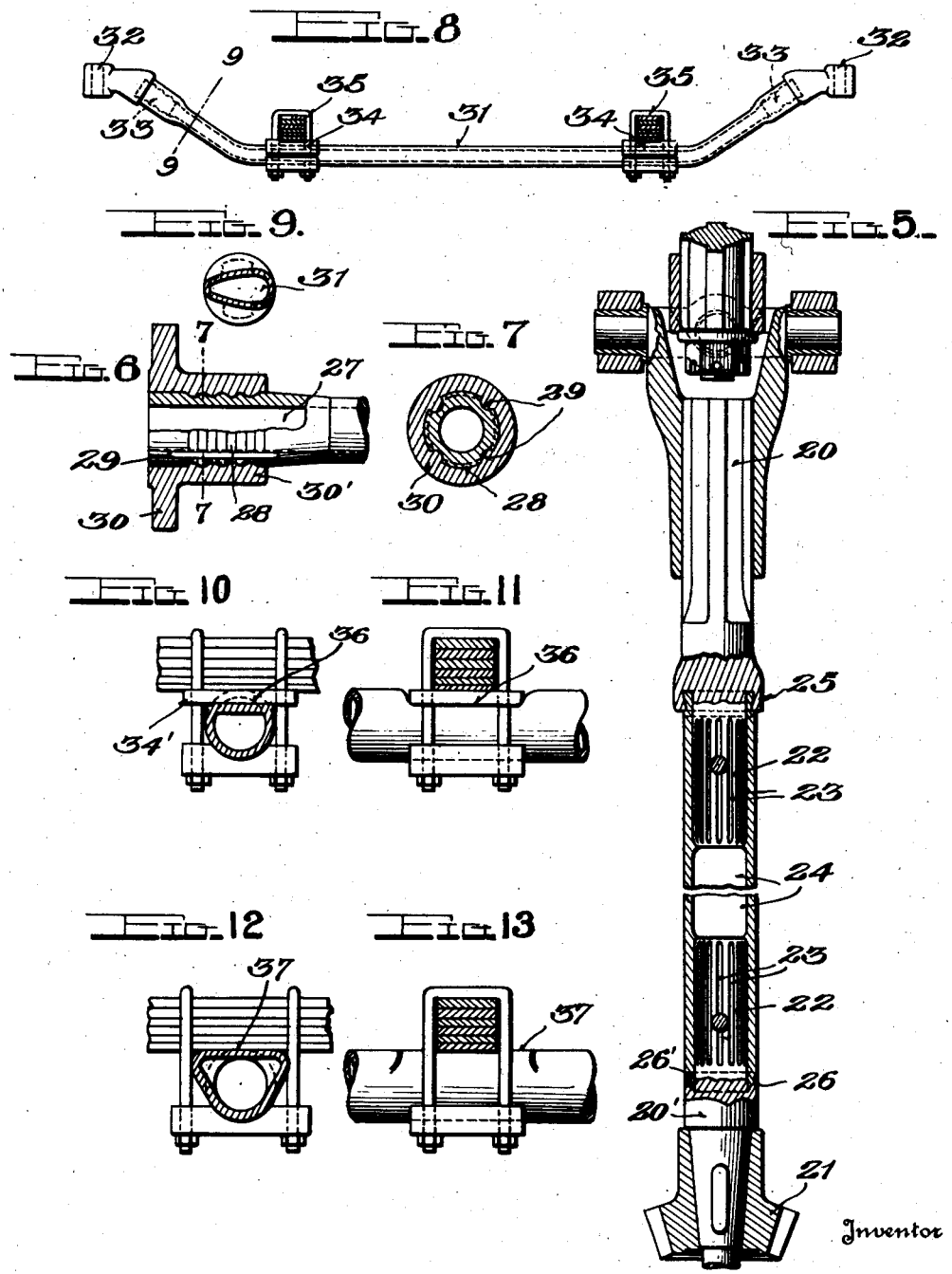
Inventor
Fritz Faudi
By
Attorney Patented Dec. 4, 1928.

1,693,838

UNITED STATES PATENT OFFICE.

FRITZ FAUDI, OF DUSSELDORF-OBERKASSEL, GERMANY.

METHOD OF MAKING SHAFTS, CONNECTING RODS, AND THE LIKE.

Original application filed March 10, 1924, Serial No. 698,054, and in Germany July 4, 1922. Divided and this application filed November 3, 1925. Serial No. 66,653.

My invention relates to an improved method of making joints for shafts, connecting rods, and the like, as the joints, for example, described and claimed in my copending application filed March 10, 1924, Serial Number 698,054, of which application this is a division.

The object of my invention is to provide a method of forming joints which will be durable and will readily withstand the blows and vibrations of rough usage, without loosening or becoming disabled.

With this aim in view, my invention consists in providing the tubular member with an end slightly, more or less, smaller in diameter than the companion member to be received is in exterior diameter, and then heating the tubular member and fitting it over the inner member whereby the two members will be held together by internal tension, the contacting surfaces of the two members being interlocked by their superficial formation.

Further, the invention resides in the novel steps and arrangement of steps hereinafter described and claimed, reference being made to the accompanying drawings, wherein Figure 1 is an elevation partly in section showing a joint formed by my improved method;

Fig. 2 is a sectional view taken on line 2—2 of Fig. 1;

Figs. 3 and 4 are elevations of modified forms of joints formed by the improved method;

Fig. 5 is a sectional view depicting a Cardan shaft having solid shaft sections secured to its ends;

Fig. 6 is an elevation partly in section showing a part of a pipe having a flange secured to its end;

Fig. 7 is a cross section on line 7—7 of Fig. 6;

Fig. 8 is an elevation showing the axis of the front wheels of an automobile having one member of the steering knuckles secured to its ends;

Fig. 9 is a cross section on an enlarged scale taken on line 9—9 of Fig. 8; and

Figs. 10, 11, 12 and 13 are detail views showing various methods of mounting the springs on the axle of the front wheels of an automobile.

Referring more in detail to the accompanying drawings, the numeral 9 designates an "inner" member and 12 the "outer" member, the latter being tubular and having its inner diameter slightly smaller, at least, than the outer diameter of the inner member 1 whereby the former will require expansion over the part of inner member on which it fits. This form of joint is exemplified in Figs. 1 and 2, wherein the tubular member 12 is heated to expand the same for receiving the inner member 9, or the cylindrical extension 8 thereof. The cooling of the tubular member, therefore, causes the same to shrink and tightly embrace the cylindrical portion 8 of the inner member 9.

The cylindrical portion 8 of member 9, in Figs. 1 and 2, is provided on its periphery with longitudinal grooves 11 and circumferential grooves 10 which intersect each other and form square or rectangular projections onto which the heated tubular member 12 shrinks, when cooling, and thereby establishes the desired firm interlock between the two members. In making the joint, the tubular member is heated to a dark red heat after which the portion 8 can readily be inserted thereinto without the application of high pressure, and when the outer member is cooled the same will have forced itself into the circumferential and longitudinal grooves 10 and 11. To accentuate this interlock, a strong ring, made in sections, and having a length equal to the portion 8, is placed about the outer member when hot and compressed. The inner member 9 is also provided with an axial flange 13 for confining the adjacent end of the tubular member, said end having a flare, as indicated at 14. It is also to be noted that the circumferential grooves 10 are completely interrupted by the deeper longitudinal grooves 11.

In Fig. 3, the cylindrical portion is formed with longitudinal grooves 15 into which the material of the tubular member is forced to form the desired interlock of the joint.

Fig. 4 depicts a connecting rod forming part of the steering mechanism of a motor vehicle, the rod consisting of a pipe 18 having spherical joints 19 secured thereto by means of the solid cylindrical portions 17 in the periphery of which are formed the circumferential grooves 16 for providing the interlock with the tubular member 18. In this form is the heating and shrinkage method of connecting the inner and outer members also utilized. The pipe provides a light rod and the joint is a firm one which will withstand the jars and vibrations incident to vehicular traffic.

Fig. 5 discloses the method in joining the several parts of a Cardan shaft of a motor vehicle, in which the tubular shaft 24 is secured at one end to the solid shaft section 20 of the Cardan joint, the solid cylindrical portion 22 of said shaft section being formed with longitudinal grooves 23 and the flange 25 embracing the adjacent end of the tubular member 24. The bevel gear 21 is secured to one end of shaft section 20', the opposite end being formed into a cylindrical portion 22 likewise longitudinally grooved at 23 to fit interlockingly into the tubular shaft 24. The shaft section 20' is here depicted as having an undercut annular portion 26 fitting on a tapering end 26' of the pipe or shaft 24 to provide a flush joint.

Another embodiment of the joint made by my improved method is exemplified in Figs. 6 and 7, wherein the flange 30 has an integral portion of tubular formation, as indicated at 30', the pipe fitting in the sleeve 30'. The pipe 27 is formed with peripheral grooves 28 and 29, running circumferentially and longitudinally thereof for being pressed into the tubular portion 30', as by a ball or mandrel, to obtain the interlocking joint. In a similar manner a second pipe or a sleeve may be secured to the pipe 27.

Figs. 8 and 9 depict a tubular front axle 31 having a part 32 of the steering knuckle secured to each end by the foregoing type of joint, the cross section of the axle being reduced rearwardly in order to reduce the resistance of the air. The tubular ends are increased in thickness and thereby provide a stronger joint about the cylindrical portion 33 of the knuckle parts 32. The springs 40 are secured to the axle by means of clamping plates 34 and the spring-embracing U-bolts 35. The axle 31 is preferably flattened, as in Figs. 13 through 16, to form broad seats for the plates 34 and 34' to prevent them from turning about on the axle which tendency they would have if the axle was truly circular.

In Figs. 10 and 11, the wall of the tubular shaft is pressed inwardly to form the seat for the upper clamping plate 34, while in Figs. 12 and 13 the wall of the axle is pressed outwardly at its top, as at 37.

While I have described the several steps of my method in detail, I wish it understood that I do not intend to be limited thereby except as the scope of the appended claims and the prior art may require, for obviously different joints may be formed in specific ways slightly different from each other and still the desideratum obtained.

What is claimed is:—

1. The method of jointing a tubular outer member to an inner member, which consists in forming an inner member with a surface having depressions and a flange overhanging and forming a groove beyond one of the margins of said depressions, heating the outer member so as to expand and soften it, passing the outer member over said surface of the inner member and fitting one of its ends beneath said flange and into said groove, and compressing and forcing the material of the heat softened outer member into the depressions of the inner member, and the flange of said inner member over the end of the outer member fitted in said groove.

2. The method of jointing a tubular outer member and an inner member, which consists in forming the inner member with axial and circumferential depressions and of a cross-section slightly larger than the inner cross-section of the outer member, heating the tubular member to soften it and axially forcing the same with a press fit on the inner member, and applying pressure to and circumferentially about the outer member to force portions of its inner periphery only into the said depressions of the inner member while simultaneously allowing said outer member to cool and shrink upon the inner member, and so as to leave the outer surface of said outer member devoid of indentures.

In testimony whereof I affix my signature.

FRITZ FAUDI.